(12) United States Patent
Suito et al.

(10) Patent No.: US 6,343,179 B1
(45) Date of Patent: Jan. 29, 2002

(54) METHOD AND APPARATUS FOR RECORDING A TV SIGNAL, METHOD AND APPARATUS FOR REPRODUCING A TV SIGNAL, APPARATUS FOR RECORDING AND REPRODUCING A TV SIGNAL, AND RECORDING MEDIUM

(75) Inventors: Taro Suito, Kanagawa; Takao Takahashi; Masashi Ohta, both of Tokyo; Toshiya Akiba, Kanagawa; Noboru Murabayashi, Saitama; Naohisa Arai, Kanagawa; Masami Tomita, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/014,280

(22) Filed: Jan. 27, 1998

(30) Foreign Application Priority Data

Feb. 4, 1997 (JP) .............................. 9-021874

(51) Int. Cl.$^7$ ................................................ H04N 5/91
(52) U.S. Cl. ............................. 386/46; 386/68; 386/95; 348/907
(58) Field of Search ............................. 386/46, 80, 81, 386/52; 358/908; 360/69, 71, 74.5; 369/3, 7, 47; 348/4, 10, 907, 460, 473, 474, 553; 725/32, 34, 35, 36

(56) References Cited

U.S. PATENT DOCUMENTS

| 3,919,479 | A | * | 11/1975 | Moon et al. .................... 348/4 |
| 5,027,400 | A | * | 6/1991 | Baji et al. ...................... 348/10 |
| 5,333,091 | A | * | 7/1994 | Iggulden et al. ............ 358/908 |
| 5,404,566 | A | * | 4/1995 | Wehrmeyer .................... 369/3 |
| 5,708,477 | A | | 1/1998 | Forbes et al. |

FOREIGN PATENT DOCUMENTS

EP     0 735 754     10/1996

* cited by examiner

*Primary Examiner*—Wendy R. Garber
*Assistant Examiner*—Christopher Onuaku
(74) *Attorney, Agent, or Firm*—Frommer Lawrence & Haug LLP; William S. Frommer; Dennis M. Smid

(57) ABSTRACT

A method and an apparatus for recording and reproducing a TV broadcasting signal includes a CM detecting unit, a write data processing circuit, a recording system control circuit, and a recording medium. The CM detecting unit operates to detect if a TV broadcasting signal composed of a RF signal inputted through an antenna is now a CM. The write data processing circuit operates to generate CM information accompanied with the CM detected by the CM detecting unit. The recording system control circuit operates to record on the recording medium the CM information generated by the write data processing circuit together with a video signal and an audio signal.

32 Claims, 13 Drawing Sheets

REARRANGE LUMINANCES
IN LARGER SEQUENCE

DETERMINE
THRESHOLD VALUE

METHOD AND APPARATUS FOR RECORDING A TV SIGNAL, METHOD AND APPARATUS FOR REPRODUCING A TV SIGNAL, APPARATUS FOR RECORDING AND REPRODUCING A TV SIGNAL, AND RECORDING MEDIUM

BACKGROUND OF THE INVENTION

1. Field of the Invention

The present invention relates to a method and an apparatus for recording a TV broadcasting signal (referred to as a TV signal) composed of a video signal and an audio signal, a method and an apparatus for reproducing a TV signal recorded on a recording medium, an apparatus for recording and reproducing a TV signal, and a recording medium for recording a broadcasting program and commercial message composed of a video signal and an audio signal.

2. Description of the Related Art

In the TV broadcasting, in general, the program contains commercial messages inserted therein. Conventionally, there has been known a method for using a sound multiplex mode for detecting the inserted commercial messages. Concretely, an apparatus for recording and reproducing a TV signal has been known which takes the steps of adding a skip start signal and a skip end signal to a start point and an end point of an interval detected as a commercial message and skipping the commercial message interval when reproducing the TV broadcasting signal.

For example, consider the case that the main program is broadcast in dual languages. If the main program contains a commercial message inserted therein, since the commercial message is normally broadcast in a stereophonic manner, the sound multiplex mode is switched from a dual language mode into a stereo mode. Hence, if the main program is broadcast not in a stereophonic manner but in a monophonic manner or in a dual language mode, the interval when the sound multiplex mode is switched into a stereophonic mode is determined as a commercial message interval.

FIG. 1 is a block diagram showing a conventional apparatus 40 for recording and reproducing a TV signal. This recording and reproducing apparatus 40 provides a function of cutting a commercial message which function is executed to detect a stereophonic interval as a commercial message interval and skip the commercial message interval when reproducing the TV signal. This apparatus 40 is a video tape recorder (VTR) provided with a magnetic tape as a recording medium.

A RF signal is inputted at an antenna 41 and then is supplied to a tuner 42. Then, this tuner 42 operates to extract a pilot signal of the sound multiplex mode. The pilot signal is supplied to the sound multiplex decoder 43. The sound multiplex decoder 43 operates to decode and determine the sound multiplex mode and send the result to a timer microcomputer 44.

The timer microcomputer 44 takes an AND of the result of the inputted sound multiplex mode and an output of a commercial message (simply referred to as CM) cut switch 45 manually controlled by a user to switch on and off the CM cutting function and then sends the AND to a main microcomputer 47. That is, in a case that the main program is determined in advance to be broadcast in dual language mode or a monophonic manner, if the CM cutting switch 45 is operated by the user, the timer microcomputer 44 enables to notify the main microcomputer 47 of the fact that the CM is detected when the sound multiplex decoder 43 outputs a stereophonic signal. A light-emitting diode 46 connected to the timer microcomputer 44 is lit up when the CM is detected so that the user can get to know the CM determined result.

The main microcomputer 47 operates to control a recording system control circuit 48 based on the CM determined result and then actuate the circuit 48 to record a video signal, an audio signal and a CM skip signal on a recording medium 49. The CM skip signal is composed of a skip start signal indicating a start point of a CM interval and a skip end signal indicating an end point of the CM interval.

On the other hand, in a reproducing system, a reproducing system control circuit 50 controlled by the main microcomputer 47 operates to read out a video signal, an audio signal and a CM skip signal from the recording medium 49 and then input them to the main microcomputer 47. If the CM skip signal is the skip start signal, the main microcomputer 47 disables to output the video signal and the audio signal to a signal processing circuit 51 until the skip end signal comes to the main microcomputer 47. It means that the video signal and the audio signal are allowed to be inputted to the signal processing circuit 51 only except the CM interval and then are fed out of the signal output circuit 52.

By the way, the apparatus for recording and reproducing a TV signal is arranged to record a skip start signal and a skip end signal on a start point and an end point of the interval detected as a CM and decode the skip start signal and the skip end signal when reproducing the TV signal so that all CMs contained in the main program are allowed to be deleted. Hence, this apparatus disables to correspond to the case that a TV watcher would like to watch a necessary number of CMs, for example, one CM or a given genre of CMs.

SUMMARY OF THE INVENTION

The present invention is made in consideration of the aforementioned conditions, and it is an object of the present invention to provide a method and an apparatus for recording a TV signal which method and apparatus are arranged to allow a reproducing apparatus side to efficiently reproduce the TV signal without having to display the same CM on the reproducing apparatus twice or more times.

It is a further object of the present invention to provide a method and an apparatus for reproducing a TV signal which method and apparatus are arranged to efficiently reproduce the TV signal without having to show the same CM to a user twice or more times and to realize the reproduction of a program with one or more proper CMs being cut, with the same CM being cut, or with only the special genre of CM specified by the user being reproduced.

It is another object of the present invention to provide a recording medium which allows the TV signal recorded thereon to be efficiently reproduced on the reproducing apparatus without having to show the same CM to the user twice or more times.

In carrying out the foregoing objects in a preferred mode, the apparatus for recording a TV signal according to the present invention is arranged to have means for detecting a CM for detecting if the received content is a CM, means for detecting CM information accompanied with the CM, and means for recording a signal for recording the CM information on a recording medium together with a video signal and an audio signal.

The method for recording a TV signal according to the present invention is arranged to detect if the received content of the TV signal is a CM and record CM information accompanied with the detected CM on a recording medium together with the video signal and the audio signal.

The apparatus for reproducing a TV signal according to the present invention is arranged to have means for separating a signal for separately extracting CM information recorded on a recording medium and means for controlling reproduction for controlling a reproducing state of the video signal and the audio signal according to the content of the CM information.

The method for reproducing a TV signal according to the present invention is arranged to separate the CM information accompanied with the CM recorded on a recording medium and control the reproducing information of the video signal and the audio signal according to the content of the CM information.

The apparatus for recording and reproducing a TV signal according to the present invention is arranged to have means for detecting a CM for detecting if the received content is a CM, means for detecting CM information for detecting the CM information accompanied with the CM, means for recording a signal for recording the CM information on a recording medium together with the video signal and the audio signal, means for separating a signal for separately extracting the CM information recorded on the recording medium, and means for controlling reproduction for controlling the reproducing state of the video signal and the audio signal according to the content of the CM information.

The recording medium according to the present invention is arranged to record the CM information accompanied with a CM together with the video signal and the audio signal.

Further objects and advantages of the present invention will be apparent from the following description of the preferred embodiments of the invention as illustrated in the accompanying drawings.

BRIEF DESCRIPTION OF THE PREFERRED EMBODIMENTS

Hereafter, the description will be oriented to a method and an apparatus for recording a TV signal, a method and an apparatus for reproducing a TV signal, and an apparatus for recording and reproducing a TV signal according to embodiments of the invention with reference to the appended drawings.

Figure 1:
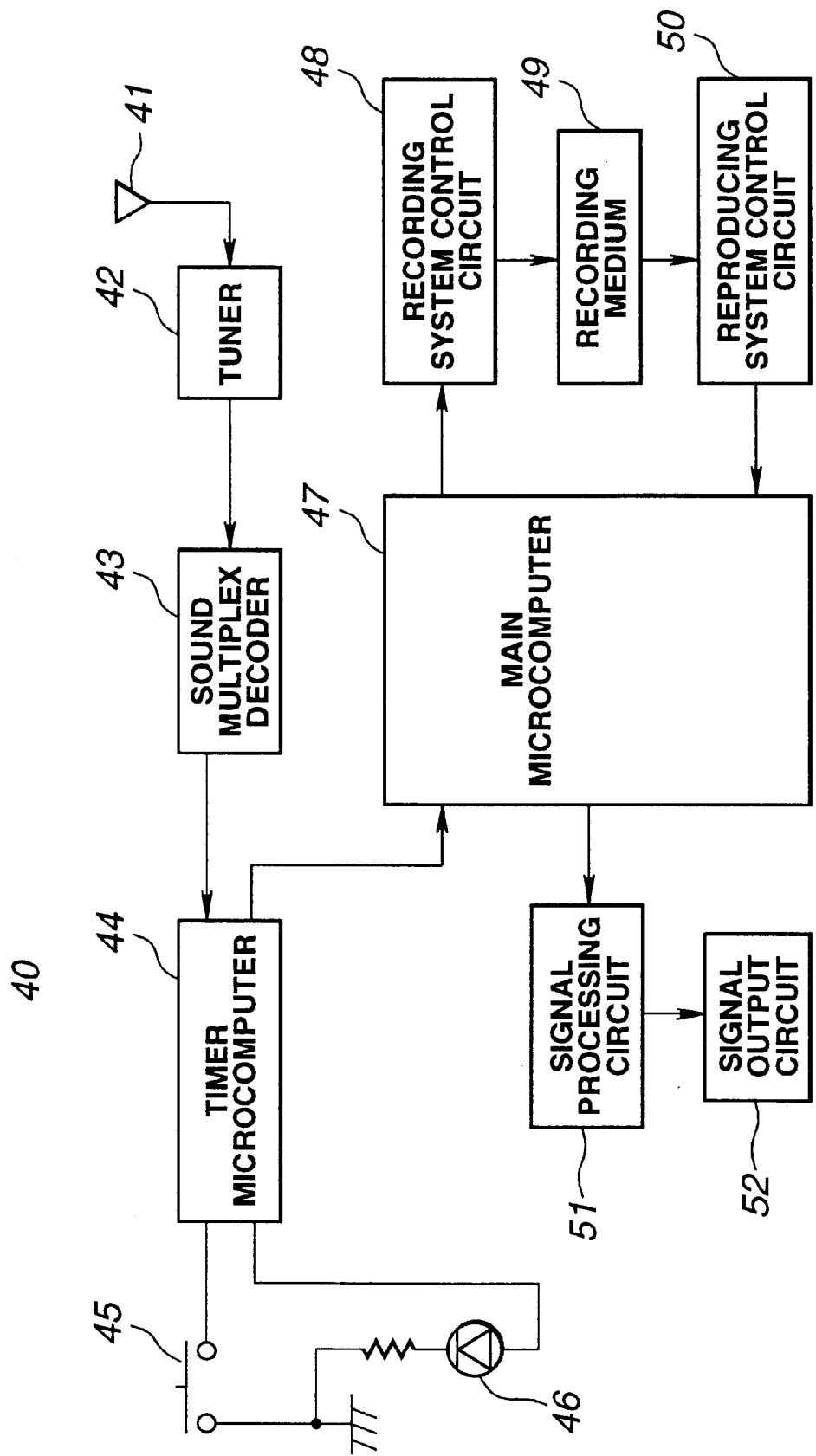
FIG. 1 is a block diagram showing a conventional apparatus for recording and reproducing a TV signal.
Figure 2:
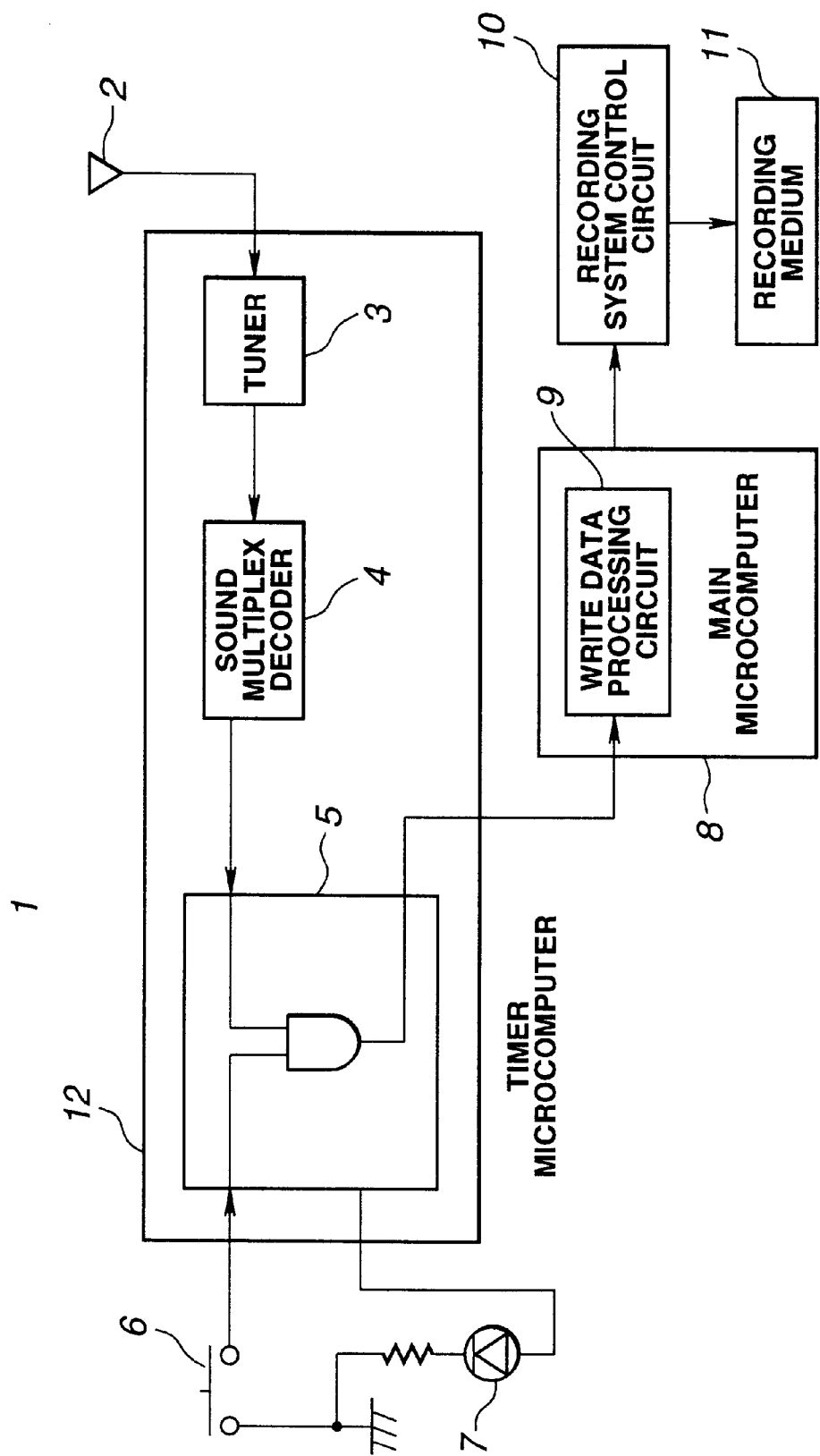
FIG. 2 is a block diagram showing an apparatus for recording a TV signal according to an embodiment of the present invention.

At first, the description will be oriented to an apparatus 1 for recording a TV signal shown in FIG. 2. This apparatus 1 is an embodiment of the method and the apparatus for recording a TV signal. The TV signal recording apparatus 1 is arranged to receive a TV signal composed of a video signal and an audio signal and then record the TV signal on a recording medium 11 such as a magnetic tape representatively like a video tape, an optical disk, a magneto-optical disk, or a magnetic disk representatively like a harddisk.

The TV signal recording apparatus 1 is arranged to have a CM detecting unit 12 for detecting if a TV signal composed of a RF signal inputted through an antenna 2 is a CM, a data processing circuit 9 for generating CM information accompanied with the CM detected by the CM detecting unit 12, and a recording system control circuit 10 for recording the CM information generated by the write data processing circuit 9 on a recording medium 11 together with the video signal and the audio signal. The write data processing circuit 9 corresponds to means for processing CM information. The recording system control circuit 10 corresponds to means for recording a signal.

The CM detecting unit 12 includes a tuner 3 for extracting a pilot signal of a sound multiplex mode from the TV signal, a sound multiplex decoder 4 for decoding and determining a sound multiplex mode from the pilot signal extracted by the tuner 3, and a timer microcomputer 5 for notifying the user of presence of a CM if the sound multiplex mode given from the sound multiplex decoder 4 is stereophonic. The write data processing circuit 9 is part of the main microcomputer 8.

The timer microcomputer 5 provides an AND gate function inside of itself so that the decoded output from the sound multiplex decoder 4, that is, the mode decoded result is ANDed with an output of a CM cutting switch 6 to be manually controlled to switch on and off the CM cutting function and the ANDed result is sent out to the main microcomputer 8.

When the user depresses the CM cutting switch 6, the switch 6 outputs a value of "1". When the user does not depress the CM cutting switch 6, the switch 6 outputs a value of "0". Hence, if the broadcasting program is recognized to be monophonic or dual-languages in advance, when the CM cutting switch 6 is depressed by the user, the timer microcomputer 5 enables to determine from the ANDed result that received content is a CM if the sound multiplex decoder 4 feeds a stereo mode signal.

That is, as listed in Table 1, the timer microcomputer 5 operates to determine that the received content is a CM only if the CM cutting switch 6 is turned on and the stereo mode signal is inputted from the sound multiplex decoder 4 and then output a value of "1" to the main microcomputer 8, while it operates to determine that the received content is a broadcasting program except that case and output a value of "0".

TABLE 1

|  | Inputted signal from sound multiplex decoder 4 is stereo mode signal | Inputted signal from sound multiplex decoder 4 is not stereo mode signal |
| --- | --- | --- |
| CM cutting switch 6 is on | Determined as a CM | Determined as a broadcasting program |
| CM cutting switch 6 is off | Determined as a broadcasting program | Determined as a broadcasting program |

The timer microcomputer 5 is connected at one end to a light-emitting diode 7 so that it is lit when the received signal is determined as a CM for notifying the user of the determined result. The other end of the timer microcomputer 8 is connected to a resistor for controlling the current.

The data processing circuit 9 built in the main microcomputer 8 operates to control the recording system control circuit 10 according to the CM determined result outputted from the timer microcomputer 5.

Figure 3:
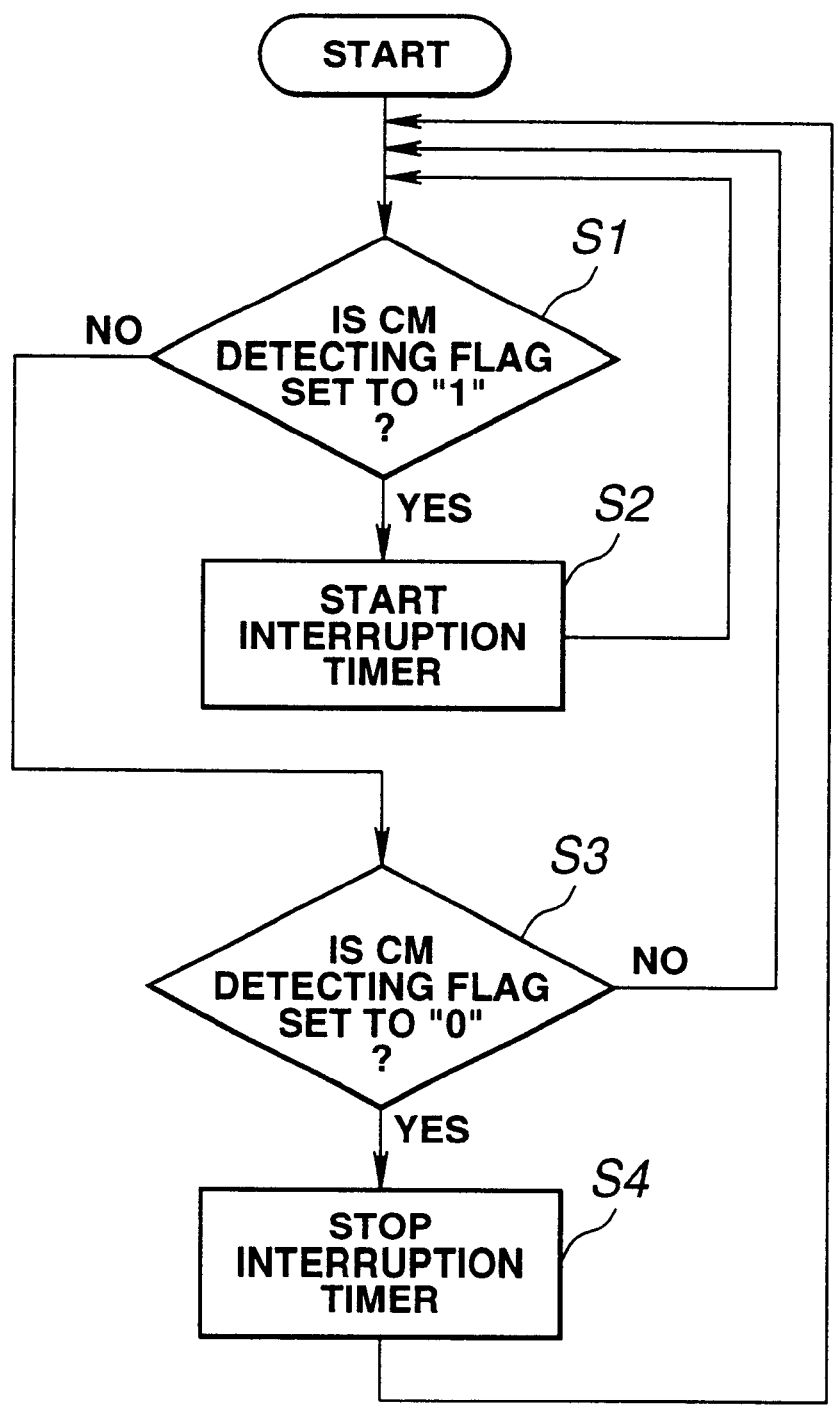
FIG. 3 is a flowchart showing a main routine for indicating an operation of a write data processing circuit built in a main microcomputer composing the apparatus for recording a TV signal.

The data processing done in the write data processing circuit 9 will be described along the flowcharts shown in FIGS. 3 and 4. FIG. 3 shows a main processing routine built in the write data processing circuit 9. At a step S1, it is detected if the CM determined result, that is, a CM detecting flag inputted from the timer microcomputer 5 is set to "1". If it is detected that the flag is set to "1", that is, the TV signal enters into a CM interval, the operation goes to a step S2. At this step, the interrupt timer built in the main microcomputer 8 is started. After the interrupt timer is started, at a step S3, the operation is waiting until the CM determined result is set to "0". Then, after it is detected, that is, the TV signal goes out of the CM interval, at a step S4, the operation is executed to stop the interrupt timer.

In the interrupt processing executed from when the interrupt timer is started to when it is stopped, an interrupt is given to the main routine at intervals of 15 seconds, for example, for generating the write data that corresponds to the CM information. The flow of this interrupt is shown in FIG. 4. The arrangement of the write data processing circuit 9 built in the main microcomputer 8 is shown in FIG. 5.

Figure 4:
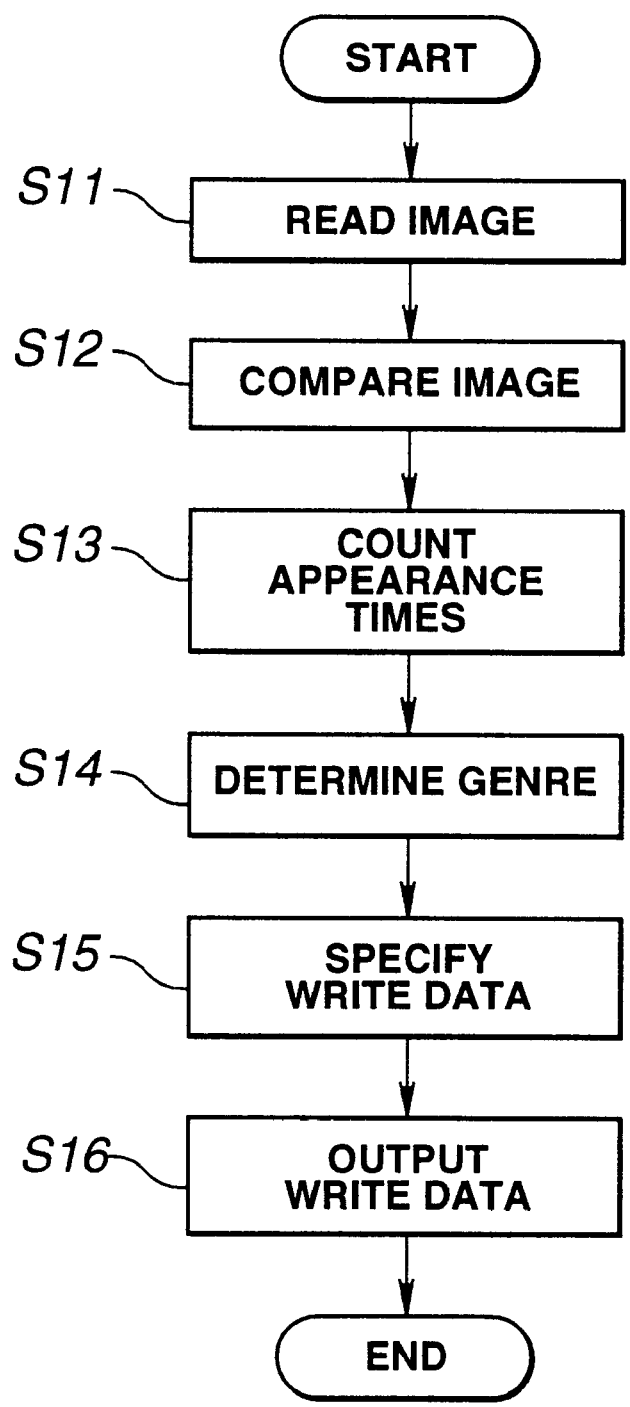
FIG. 4 is a flowchart showing an interrupt process executed by the write data processing circuit.
Figure 5:
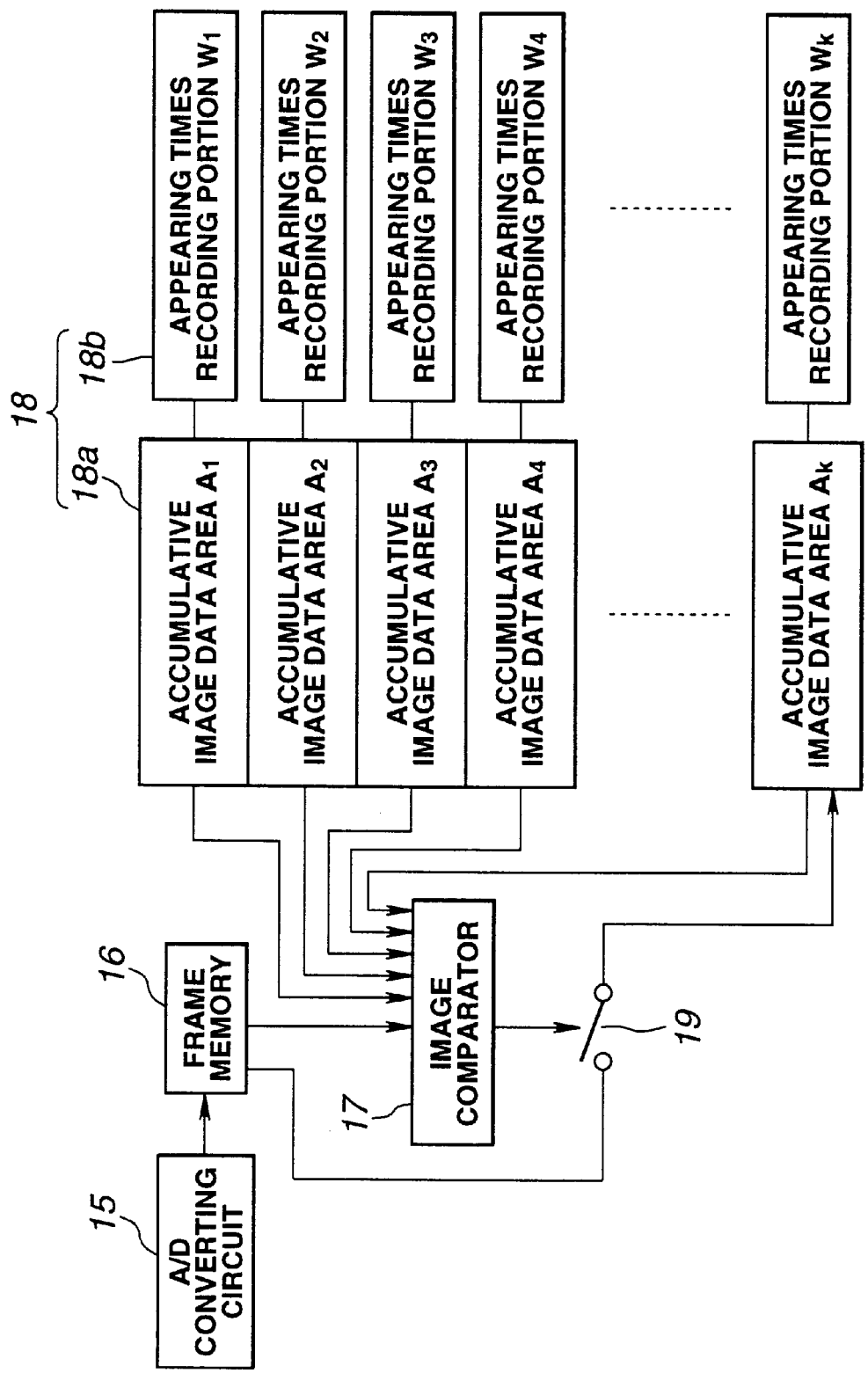
FIG. 5 is a block diagram showing the write data processing circuit in detail.

At a step S11 shown in FIG. 4, the video signal inputted to the main microcomputer 8 is converted into a digital signal through the effect of an analog-to-digital converter 15 shown in FIG. 5. The digital signal is stored in a frame memory 16 for reading an image. Then, at a step S12, the image read in this frame memory 16 is compared with each of plural pieces of image data saved in accumulative image data areas $A_1, A_2, A_3, \ldots A_K$ of an accumulative image data section 18a contained in a storage medium 18 for accumulative images such as a harddisk drive through the effect of an image comparator 17. The image comparator 17 operates to convert the correlation between the images into numerical values for doing the image comparison.

The method for calculating a correlation may take (1) a method for using a correlation of a histogram of a signal level of each image, (2) a method for taking a difference of each pixel of each image and using the integral value of the differences into a correlation value, and (3) a method for dividing each image into plural areas, calculating a correlation of each area, and taking a decision-by-majority of the correlations. Herein, the method (2) is adopted, because it is deemed to be the simplest.

Figure 6A:
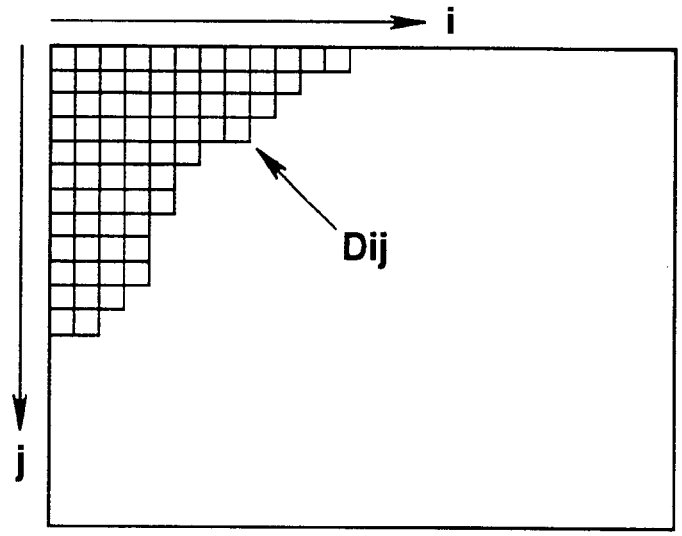
FIG. 6 is an explanatory view showing a process for calculating correlation values of an image.
Figure 6B:
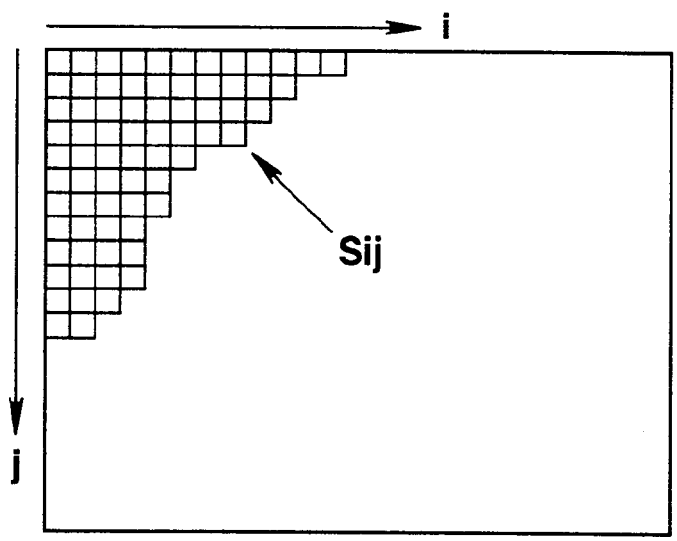

The method (2) will be described with reference to FIG. 6. The image saved in the frame memory 16 has an image size of n×m and the image stored in the storage medium 18 has an image size of n×X m as well. The horizontal coordinate is i and the vertical coordinate is j. As shown in FIG. 6A, the data at the image coordinate (i, j) saved in the frame memory 16 is $D_{ij}$, while as shown in FIG. 6B, the data at the coordinate (i, j) of the image stored in the storage medium 18 is $S_{ij}$.

The correlation value $E_k$ between the image stored in the frame memory 16 and the image stored in the storage medium 18 may be expressed as:

$E_k = \Sigma\Sigma abc(D_{ij} - S_{ij})$ wherein abc is a function for deriving an absolute value.

If the correlation value $E_k$ is smaller than a given threshold value, it means that the correlation degree between two images is large. The image comparator 17 determines that two images coincide with each other.

Concretely, the write data processing circuit 9 operates to operate the correlation value $E_k$ between the video signal and the audio signal stored in the storage medium 18 at intervals of 15 seconds, for example, after the CM detecting unit 12 detects a CM and the video signal and the audio signal obtained at intervals of 15 seconds after the CM detecting unit 12 newly detects a CM. If the correlation value $E_k$ is smaller than the given threshold value, it is determined that two images coincide with each other.

The calculation of this correlation value $E_k$ is repeated the number k of the stored images, that is, until the image stored in the frame memory 16 coincides with any image stored in the accumulative image data areas $A_1, A_2, A_3, \ldots A_k$ of the accumulative image data section 18a of the storage medium 18.

If the image stored in the frame memory 16 does not coincide with any image stored in the data areas $A_1, A_2, A_3, \ldots A_k$, or if no accumulative image is stored therein, the image comparator 17 determines that the image stored in the frame memory 16 is a new CM. By turning on the switch 19, the new CM image is added to the accumulative image data area $A_{k+1}$ of the accumulative image.

If the images are determined to be the same as a result of comparing the images through the image comparator 17, at a step S13 shown in FIG. 4, an appearing time is incremented by 1 and then is written in each recording portion $W_1, W_2, W_3, \ldots W_k$ of an appearing time recording unit 18b, each recording portion corresponding to the accumulative image data areas $A_1, A_2, A_3, \ldots A_k$. The process of this step S13 is executed on the principle that by using the fact that the CM is in general extended for 15 seconds, the images at intervals of 15 seconds are compared with the pre-stored CM image for detecting the times of the appearance of the same CM.

At a time, the write data processing circuit 9 operates to write the appearing times of each CM together with the video signal and the audio signal in the recording medium 11 as viewing each appearing time value recorded in each recording portion $W_1, W_2, W_3, \ldots W_k$ according to the subcode data of the format (to be discussed below) to be added at each frame of the video signal and the audio signal of the CM and the broadcasting program.

Next, at a step S14, the kind of the content of the CM, that is, the genre of the CM is determined. The CMs are grouped into cars, foods, electric products, and so forth and the genre information is added to the write data that corresponds to the CM information.

Figure 7:
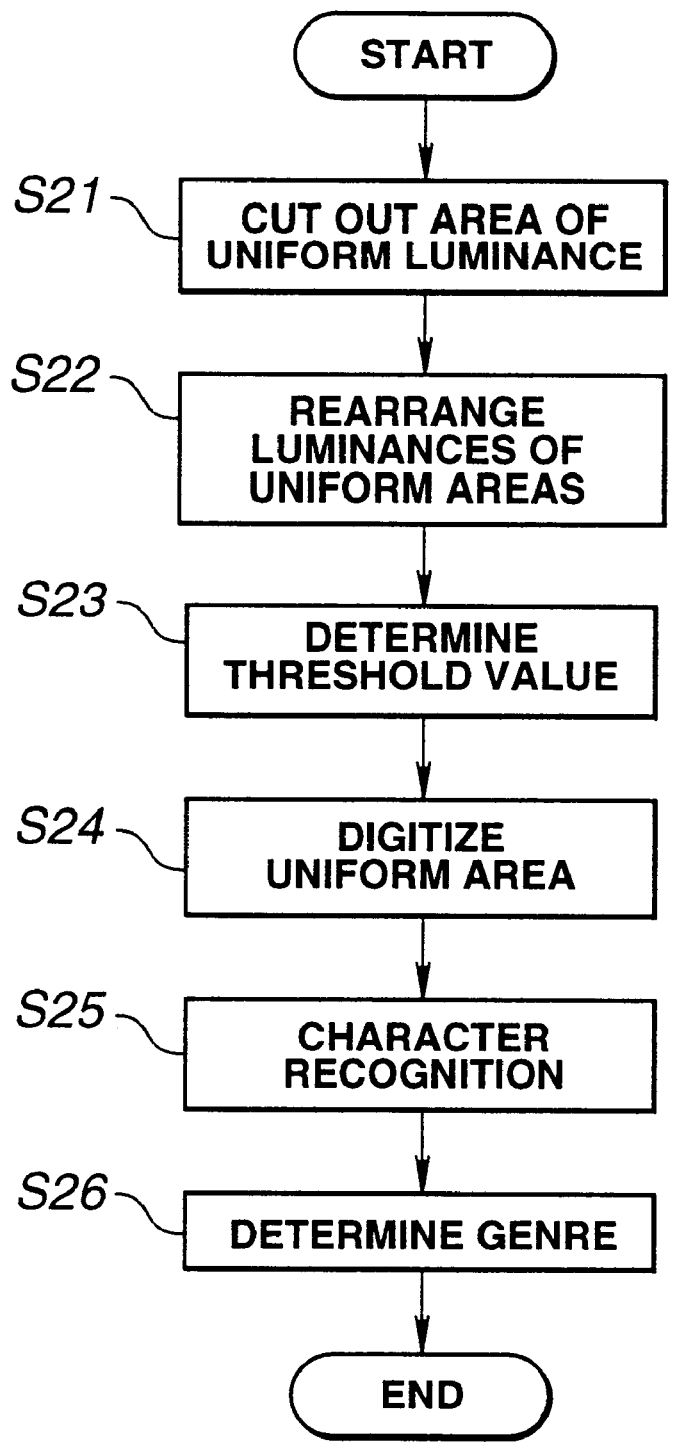
FIG. 7 is a flowchart showing an algorithm for determining a genre.

The algorithm for determining the genre will be described with reference to the flowchart of FIG. 7. At first, at a step S21, an area of a uniform luminance is cut out of the image stored in the frame memory 16 according to the following procedure.

The uniformity $Y_{ij}$ close to p×p of the coordinate (i, j) of the accumulative image data of the frame memory 16 shown in FIG. 6A is obtained by the following expression.

$$Y_{ij} = \Sigma\Sigma abc(D_{ij} - D_{(i+x)(j+y)})$$

wherein x and y takes a value from 0 to p in sequence and abc denotes a function for deriving an absolute value. If $Y_{ij}$ is a given threshold value, the pixel of (i, j) is determined to be part of the uniform area.

Figure 8A:
FIG. 8 is an explanatory view showing a pattern for determining a threshold value.
Figure 8B:

Next, at a step S22, the luminances of the uniform areas cut out at the step S21 are rearranged in sequence of larger luminance as shown in FIG. 8. Then, at a step S23, the threshold value is determined. For example, if the z number of pixels are selected as the uniform area, after the pixels are rearranged in sequence of larger luminance, the luminance of the z/2-nd pixel is determined as the threshold value as shown in FIG. 8.

Next, at a step S24, by using the threshold value determined at the step S23, each pixel of the uniform area cut out at the step S21 is converted into a digital value. In this embodiment, the pixel of the uniform area having a greater luminance than the threshold value is converted into a value of "1", while the pixel of the uniform area having a smaller luminance than the threshold value is converted into a value of "0".

In the digitized pixel area of the uniform luminance, the area of "0" and the area of "1" are matched in pattern to plural character data stored in a character data ROM (not shown) built in the main microcomputer 8 shown in FIG. 2. The process of the pattern matching will be described below with reference to FIG. 9.

Figure 9A:
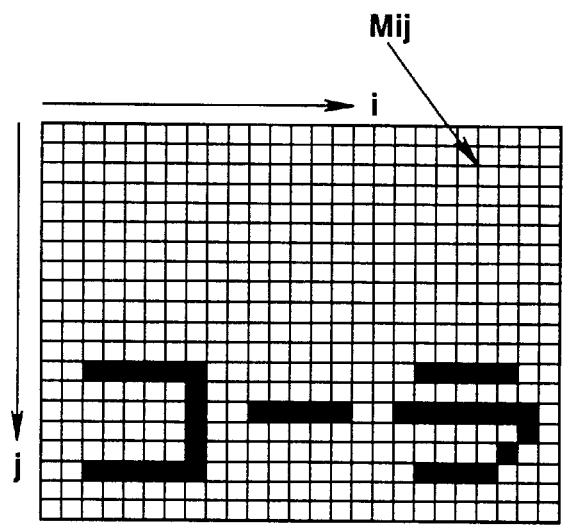
FIG. 9 is an explanatory view showing pattern matching for extracting a character.
Figure 9B:
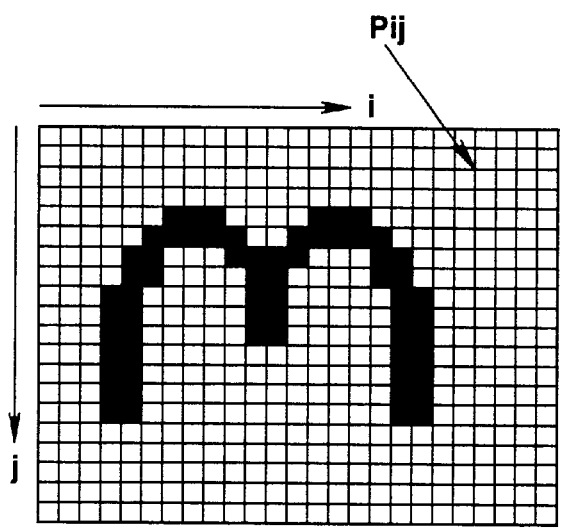

$M_{ij}$ shown in FIG. 9A denotes an image that is cut out as the uniform luminance area from the image stored in the frame memory 16 at the step S21 and digitized through the steps S22, S23 and S24. $P_{ij}$ shown in FIG. 9B is one of the character patterns stored in the character data ROM (not shown) stored in the main microcomputer 8. It is digitally represented by "0" and "1". These two images are matched in pattern and the evaluation value Q is obtained by the following expression.

$$Q = \Sigma\Sigma abc(M_{ij} - P_{ij})$$

wherein abc denotes a function for deriving an absolute value.

Further, as stated above, $M_{ij}$ and $P_{ij}$ are represented by "0" and "1". If Q is equal to or lower than the given threshold value, it is determined two images coincide with each other.

If these two images coincide with each other, at a step S26, the genre information pre-given to $P_{ij}$ is substituted in $M_{ij}$, which is made to be the write data. If these two images are not matched in pattern, the character recognition is repeated until both are matched or until all characters in the character data ROM are used. If no coincidence with the data of the character data ROM takes place, it is determined that $M_{ij}$ is not a character and $M_{ij}$ is not specified as a genre.

Figure 10:
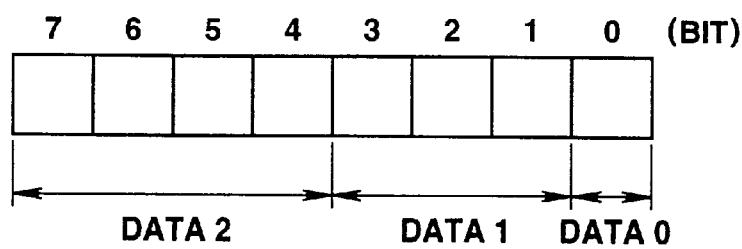
FIG. 10 is a view showing a format of a CM information signal that will be the write data.

In turn, returning to the step S15 shown in FIG. 4, the operation is executed to specify the write data that is made to be the CM information and create this write data as the subcode data of the format shown in FIG. 10 by using the data buffer. Herein, one-byte (8bits) write data for one frame is prepared. The content of the write data will be described with reference to Table 2.

TABLE 2

| Data 0 | | Data 1 | | Data 2 | |
|---|---|---|---|---|---|
| Not CM | 0 | Not CM | 0 | Not CM | 0 |
| CM | 1 | Times 1 | 1 | Car | 1 |
|  |  | Times 2 | 2 | Foods | 2 |
|  |  | Times 3 | 3 | Electric Products | 3 |
|  |  | Times 4 | 4 | Others | 4 |
|  |  | Times 5 | 5 |  |  |
|  |  | Times 6 | 6 |  |  |
|  |  | Times 7 or higher | 7 |  |  |

As shown in FIG. 10, the least significant bit (0 bit) indicates whether or not it is a CM by "1" or "0". For example, after detecting the rise of the CM at the step S1 shown in FIG. 3, the least significant bit is set to "1" if the fall of the CM is not detected or to "0" unless so.

Next, from the first to the third bits, the appearing times of the CMs counted at the step S13 shown in FIG. 4 are written at each CM detected by the CM detecting unit 12. If the corresponding frame to the data at those bits is not a CM, a value of "0" is written to the data. Or if the appearing times exceed a value of "7" (3 bits), a value of "7" is written to the data.

Next, from the fourth bit to the seventh bit, the genre of the CM determined at the step S14 shown in FIG. 4 is written to the bits. Herein, if the genre is cars, a value of "1"is written to those bits. If it is foods, a value of "2" is written to the bits. If it is electric products, a value of "3" is written to the bits. If it is the others, a value of "4" is written to the bits. If the corresponding frame to the data at the bits is not a CM or no genre is specified, a value of "0" is written to those bits.

At the step S16 shown in FIG. 4, the write data is modulated into the recording format together with the video data and the audio data and then is sent to the recording system control circuit 10. The recording system control circuit 10 operates to record the video signal, the audio signal and the write data that is to be the CM information onto the recording medium 11.

The TV signal recording apparatus 1 shown in FIG. 2 operates to detect a CM based on a change of the pilot signal of the sound multiplex mode and store the video signal and the audio signal of this CM for a given time, for example, an interval of 15 seconds and count the appearing times of each CM for the purpose of efficiently reproducing the TV signal on the reproducing apparatus without having to show the CM to the user twice or more times.

Further, the pattern matching of a telop of a CM extracted as CM information to a character is executed for specifying and grouping the kind of the CM, that is, the genre of the CM. By this operation, when reproducing the TV signal, only the specific genre of CMs are allowed to be shown to the user. This is an effective recording and reproducing method in the age of increasing the channels and enhancing the variety of CMs In turn, the description will be oriented to an apparatus 20 for reproducing a TV signal shown in FIG. 11 as an embodiment of the method and the apparatus for reproducing a TV signal according to the present invention. The TV signal reproducing apparatus 20 operates to reproduce a TV signal composed of a video signal and an audio signal recorded on the recording medium 11.

The apparatus 20 for reproducing a TV signal is arranged to have a reproducing system control circuit 21 for reading a video signal, an audio signal and a CM information signal from the recording medium 11, modulate those signals, and then separately extract the CM information and a read signal processing circuit 23 for controlling the reproducing state of the video signal and the audio signal according to the content of the CM information signal sent from the reproducing system control circuit 21 and the signal sent from a user setting circuit 24. The read signal processing circuit 23 is part of the main microcomputer 22.

The user setting circuit 24 is a circuit for receiving an input of skipping a CM, avoiding the appearance of the same CM twice, and watching the CM of cars from the user. The user setting circuit 24 operates to distinctly generate a CM cutting mode, the same CM cutting mode, and an each genre CM reproducing mode. The CM cutting mode is a mode at which the CM is skipped in reproducing the TV signal. The same CM cutting mode is a mode at which the previously outputted CM is avoided in reproducing the TV signal. The each genre reproducing mode is a mode at which only the CMs of the genre specified by the user is outputted.

Figure 12:
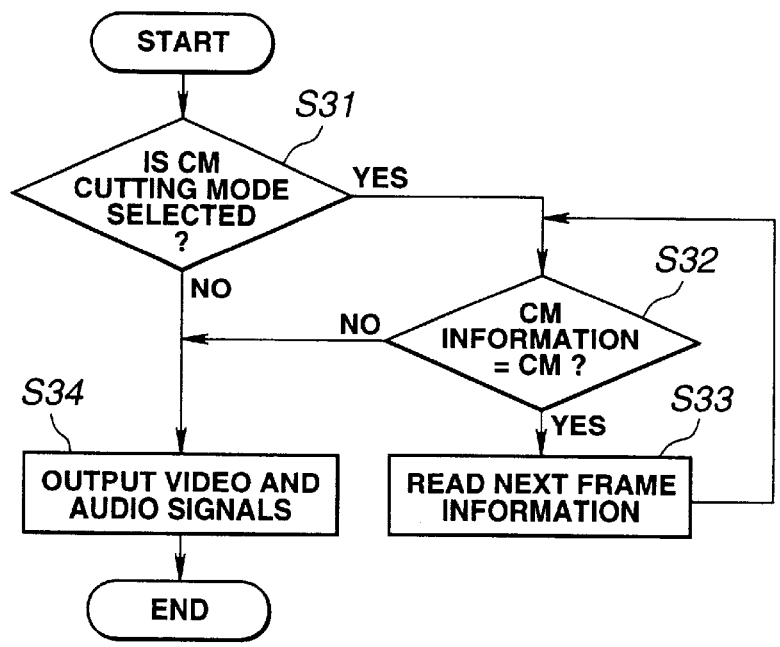
FIG. 12 is a flowchart showing a flow of an operation for a CM cutting mode of a read signal processing circuit composing the apparatus for reproducing a TV signal.
Figure 13:
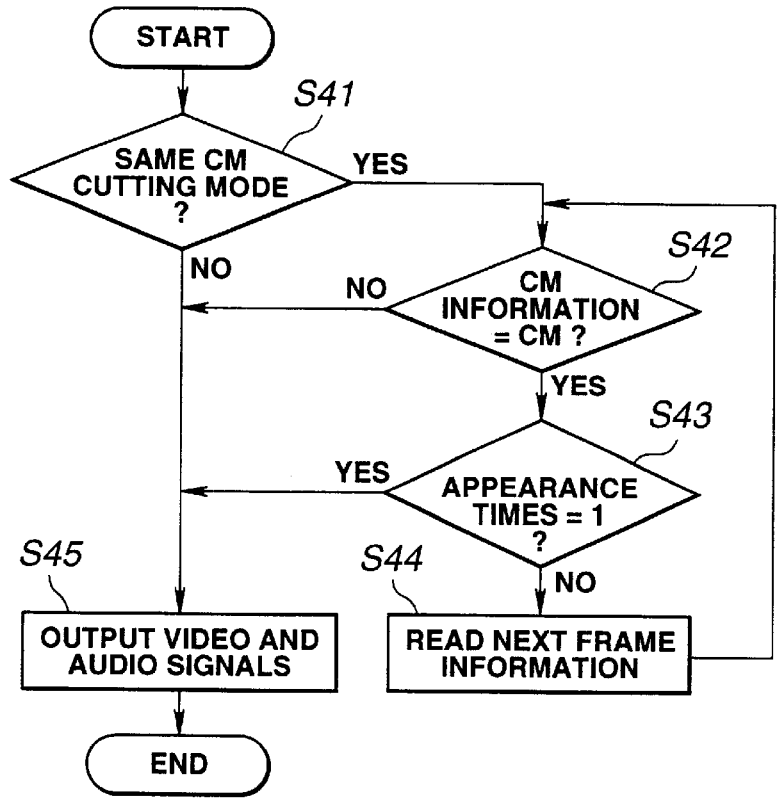
FIG. 13 is a flowchart showing a flow of an operation for the same CM cutting mode of the read signal processing circuit.
Figure 14:
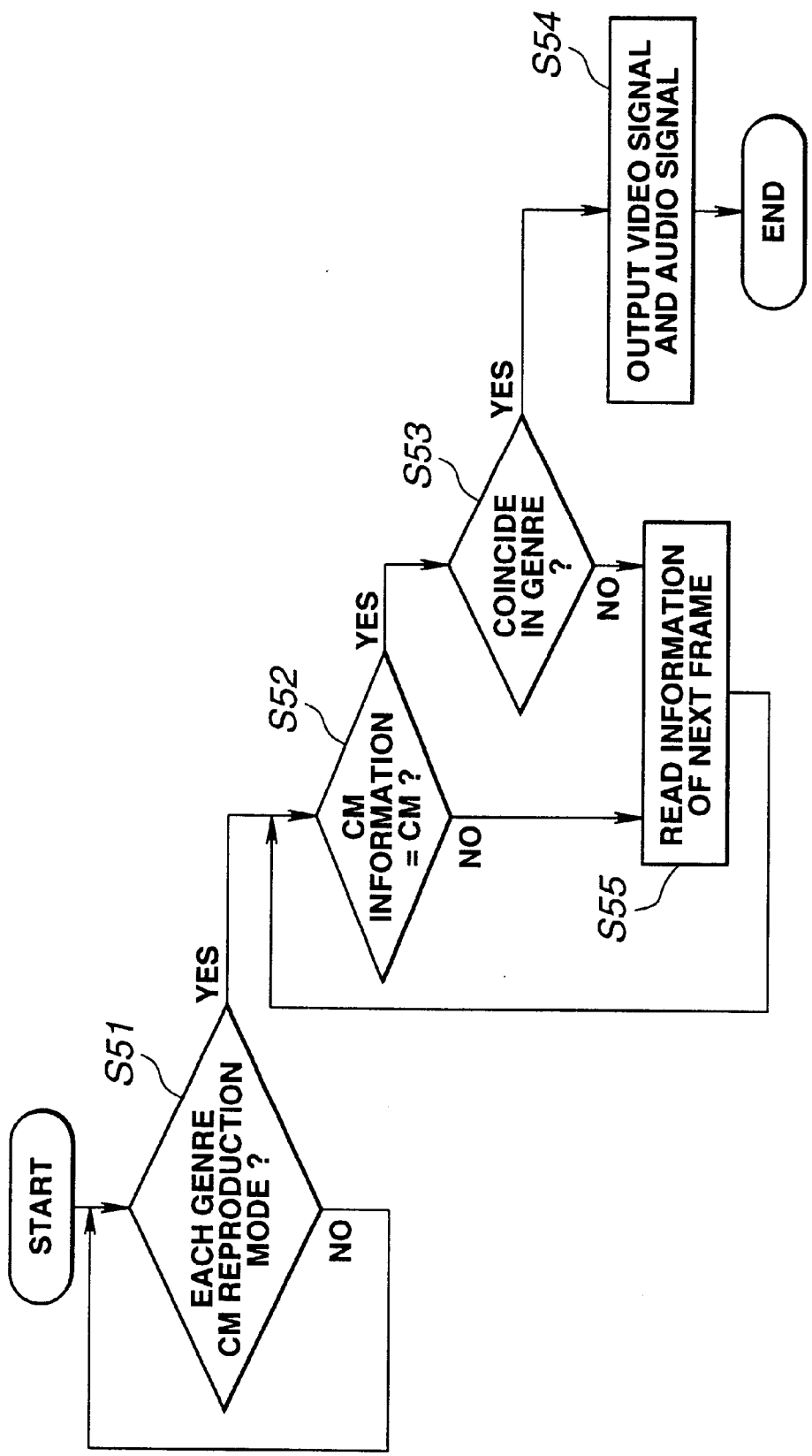
FIG. 14 is a flowchart showing a flow of an operation for each genre type CM reproducing mode of the read signal processing circuit.

Later, the operation of the read signal processing circuit 23 for each mode will be described with reference to the flowcharts of FIGS. 12 to 14.

At first, the operation for the CM cutting mode will be described. The read signal processing circuit 23 determines if the CM cutting mode is selected and this mode is received at the step S31 shown in FIG. 12. If the CM cutting mode is received through a serial communication, the read signal processing circuit 23 operates to decode the CM information signal and read the data at 0 bit (referred to as a CM flag) of the format shown in FIG. 10 at the step S32 for the purpose of determining if the frame at the 0 bit is a CM. If it is the CM, that is, if the CM flag at 0 bit of the CM information signal is "1", the read signal processing circuit 23 operates to read the next video signal, the next audio signal and the next CM information signal from the recording medium 11 through the reproducing system control circuit 21 at the step S33. This is repeated until the frame at 0 bit of the CM information signal is not a CM, that is, the CM flag indicates a value of "0". As such, when the CM cutting mode is selected, only the video signal and the audio signal of the broadcasting program that is not the CM are reproduced like the process at the step S34 and then are outputted to the signal processing circuit 25 and the signal output circuit 26.

Next, the operation for the same CM cutting mode will be described. The read signal processing circuit 23 operates to select the same CM cutting mode at the step S41 shown in FIG. 13 and determine if the same CM cutting mode is received. When the same CM cutting mode is received through a serial communication, the read signal processing circuit 23 operates to decode the CM information signal and determine if the CM flag of the format shown in FIG. 10 is a value of "1" at a step S42. If the CM flag is a value of "1", the operation goes to a step S43 at which by reading the data from the first to the third bits of the format shown in FIG. 10, the appearing times of the CM can be detected from the correspondence table shown in Table 2. If at this step S43 the appearing times are 1, the read signal processing circuit 23 operates to reproduce the video signal and the audio signal as it does like the process at the step S45 and output these signals through the signal processing circuit 25 and the signal output circuit 26. If the appearing times are determined to be 2 or more at the step S43, it means that the CM is previously flown. Hence, the read signal processing circuit 23 operates to read the next video signal, the next audio signal and the next CM information signal from the recording medium 11 through the reproducing system control circuit 21 like the process at the step S44. This is repeated until the portion that the appearing times are 1 or the CM mode is "0" (indicating the program itself) appears. When the same CM cutting mode is selected, the same CM can be viewed only once. The appearing times of the same CM may be limited to once but also twice, three time or the given times.

For example, if the user sets the user setting circuit 24 so that the user wants to watch the same CM only twice, the read signal processing circuit 23 operates to read the subcode data of the format shown in FIG. 10 of the first to the third bits added to each frame recorded on the recording medium 11 and output the CMs whose appearing times are "1" or "2" through the signal processing circuit 25 and the signal output circuit 26. The CMs whose appearing times are "3" or more are skipped.

In turn, the description will be oriented to the operation for each genre CM reproducing mode. At the step S51 shown in FIG. 14, the read signal processing circuit 23 operates to determine if the each genre CM reproducing mode is selected by the user setting circuit 24 and is received. When the each genre CM reproducing mode and the selected genre (for example, cars, foods, electric products, and the other four genres) are received, the read signal processing circuit 23 operates to decode the CM information signal and determine if the CM flag of the format shown in FIG. 10 is set to "1" at the step S52. Herein, if the CM flag is set to "1", the operation goes to a step S53. At this step, by reading the data at the fourth to the seventh bits, the CM genre (referred to as the genre information) can be detected from the correspondence table shown in Table 2. It is determined if the detected genre information is a genre set by the user through the user setting circuit 24 at the step S53. If both of the genres are matched to each other, the read signal processing circuit 23 operates to reproduce the video signal and the audio signal at a step S54 and then output these signals through the signal processing circuit 25 and the signal output circuit 26.

In a case that the CM flag is not set to "1" at the step S52 or the genre is not matched to the genre set by the user at the step S53, at a step S55, the next video signal, audio signal and CM information signal are read from the recording medium 11 through the reproducing system control circuit 21. At the step S53, this operation is repeated until the genre information of the CM information signal is matched to the value set by the user.

When the each genre CM reproducing mode is selected, only the CM of the genre specified by the user is allowed to be outputted. The kind and the number of the genres are not limited to those of the foregoing embodiment.

Figure 11:
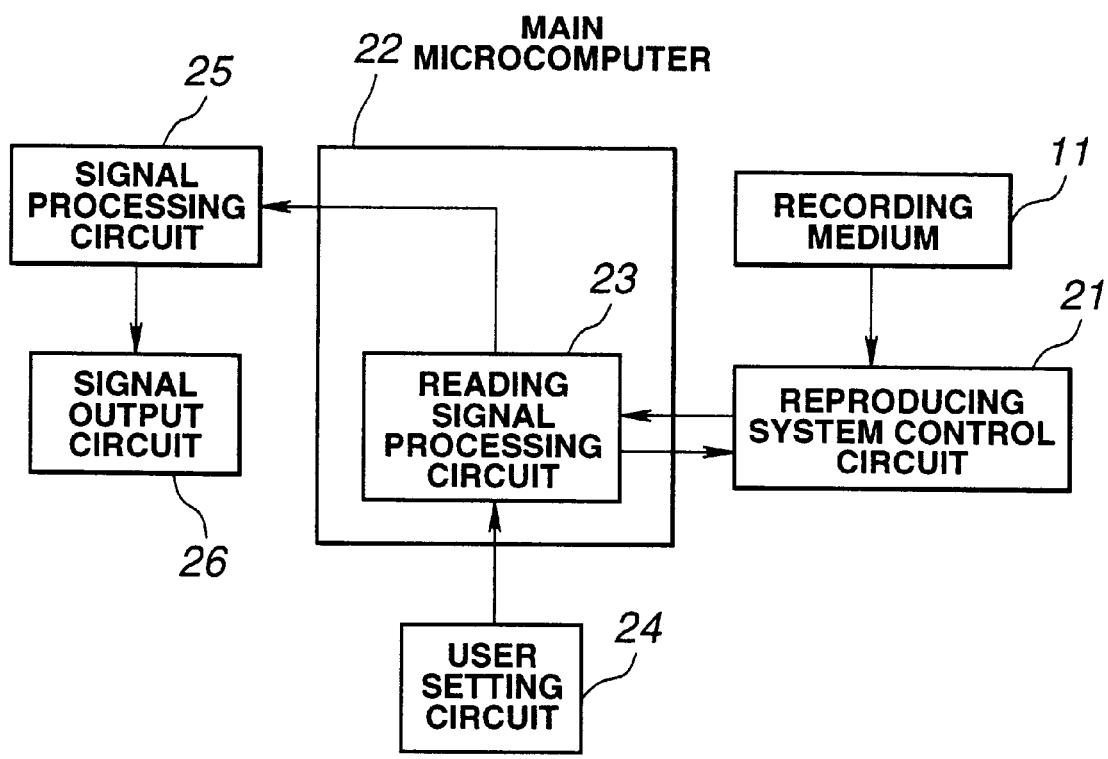
FIG. 11 is a block diagram showing an apparatus for reproducing a TV signal according to another embodiment of the present invention.

As set forth above, the TV signal reproducing apparatus shown in FIG. 11 enables to reproduce the TV signal with a proper CM being cut, with the same CM being cut or with only the specific genre specified by the user being reproduced.

In FIG. 11, the video signal and the audio signal outputted from the main microcomputer 22 are converted into a signal format that may be fed to a monitor, such as a composite signal like an NTSC or a component signal like RGB through the effect of the signal processing circuit 25. Then, the converted signal may be outputted to the signal output circuit 26. The signal output circuit 26 operates to output the composite signal or the component signal to the monitor.

Figure 15:
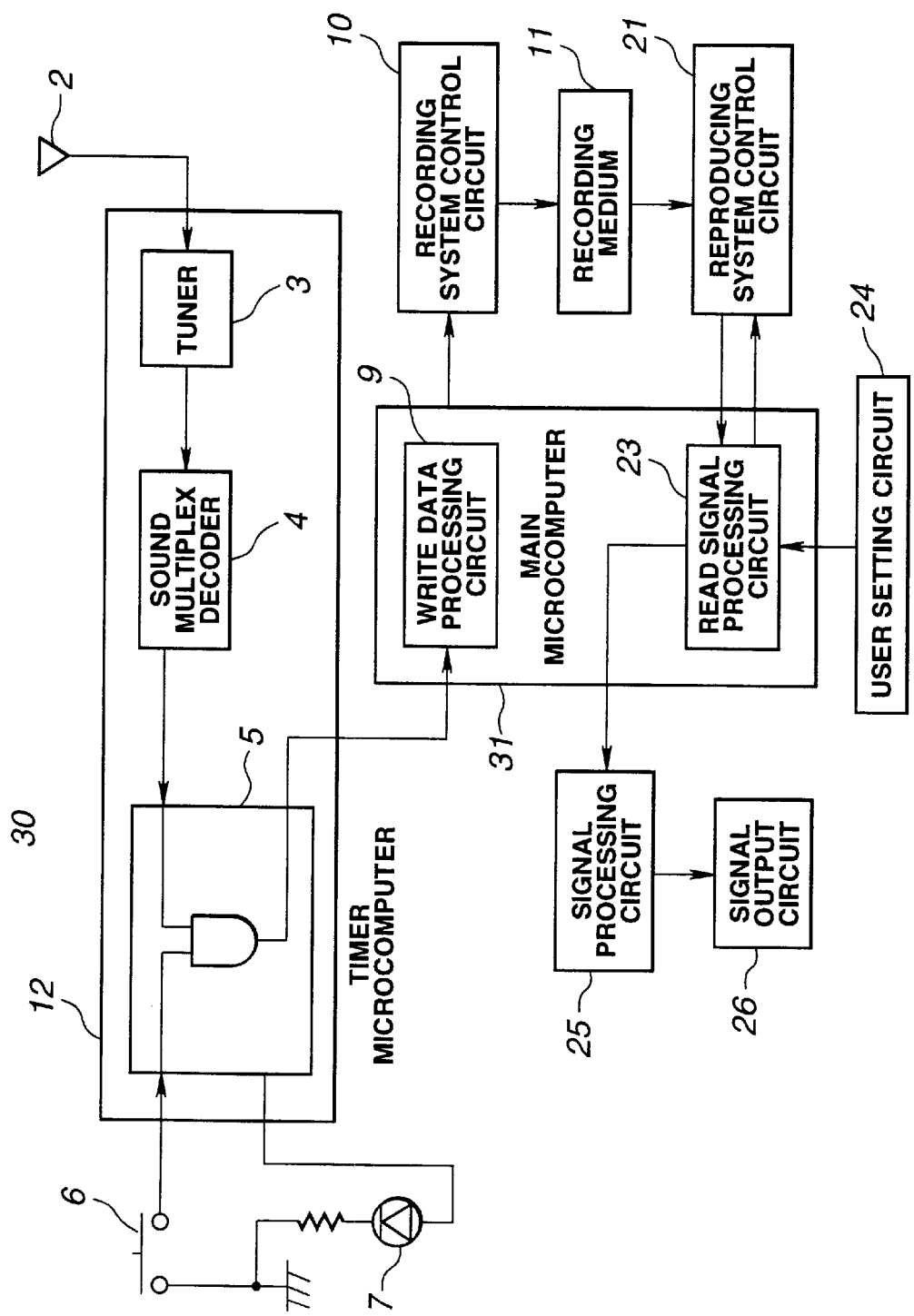
FIG. 15 is a block diagram showing an apparatus for recording and reproducing a TV signal according to another embodiment of the present invention.

In turn, the description will be oriented to an apparatus 30 for recording and reproducing a TV signal shown in FIG. 15 according to an embodiment of the present invention. This apparatus for recording and reproducing a TV signal operates to receive the TV signal composed of a video signal and an audio signal, record the TV signal on the recording medium, and reproduce the TV signal from the recording medium.

The apparatus 30 is arranged of the combination of the TV signal recording apparatus 1 shown in FIG. 2 and the TV signal reproducing apparatus 20 shown in FIG. 11.

The apparatus 30 for recording and reproducing a TV signal includes a CM detecting unit 12, a write data processing circuit 9, a recording system control circuit 10, a reproducing system control circuit 21, a user setting circuit 24, and a signal processing circuit 23. The CM detecting unit 12 operates to detect if the TV signal composed of a RF signal inputted from an antenna 2 is now a CM. The data processing circuit 9 operates to generate the CM information accompanied with the CM detected by the CM detecting unit 12. The data processing circuit 9 corresponds to means for processing CM information. The recording system control circuit 10 operates to record the CM information generated by the write data processing circuit 9 on a recording medium 11 together with the video signal and the audio signal. The recording control circuit 10 corresponds to means for recording a signal. The reproducing system control circuit 21 operates to read the video signal, the audio signal and the CM information signal from the recording medium 11, demodulate those signals, and separately extract the CM information. The signal processing circuit 23 operates to control the reproducing state of the video signal and the audio signal according to the content of the CM information signal sent from the reproducing system control circuit 21 and the signal sent from the user setting circuit 24. The write data processing circuit 9 and the read signal processing circuit 23 are part of the main microcomputer 31. The description about the operation of the apparatus 30 is left out.

The apparatus for recording and reproducing a TV signal shown in FIG. 15 operates to detect a CM according to the change of the pilot signal of the sound multiplex mode, store and hold the video signal and the audio signal of this CM for a given time such as 15 seconds, and count the appearing times of each CM. Hence, this apparatus enables to efficiently reproduce the TV signal without having to watch the same CM several times. Further, this apparatus makes it possible to cut a proper CM in reproducing the TV signal, avoid the reproduction of the same CM twice or more, and reproduce the CM of only a specific genre specified by the user.

In the foregoing apparatuses of the embodiments, the recording medium 11 is arranged to record the overall TV signal composed of the video signal and the audio signal containing the program and the relevant CMs and the CM information accompanied with the CMs. Hence, the recording medium 11 enables to efficiently reproduce the TV signal on the reproducing apparatus without having to show the same CM to the user twice or more.

In addition, the recording medium may be a medium for recording only the TV signal or software information such as a cinema, a music program, and a sport program. In place, it may be a medium for recording a game software.

The method and the apparatus for recording a TV signal according to the invention are arranged to detect if the received content of the TV signal corresponds to a CM and record the CM information accompanied with the detected CM on the recording medium together with the video signal and the audio signal. Hence, this method and apparatus enables to efficiently reproduce the TV signal on the reproducing apparatus without having to show the same CM to the user twice or more times.

The method and the apparatus for reproducing a TV signal according to the present invention are arranged to separate the CM information accompanied with the CM recorded on the recording medium and control the reproducing information of the video signal and the audio signal according to the content of the CM information. Hence, the method and the apparatus enables to cut a proper CM in reproducing the TV signal, avoid the reproduction of the same CM twice or more times, and reproduce a CM of only a specific genre specified by the user.

The apparatus for recording and reproducing a TV signal according to the present invention is arranged to detect if the received content of the TV signal is a CM, record on the recording medium the CM information accompanied with the detected CM and the video and the audio signals, and control the reproduction information of the video and the audio signals according to the content of the CM information. Hence, the apparatus enables to efficiently reproduce the TV signal without having to show the CM to the user twice or more times. Further, the apparatus also enables to cut a proper CM in reproducing the TV signal, avoid the reproduction of the same CM twice or more, and reproduce the CM of only a specific genre specified by the user.

The recording medium according to the present invention is arranged to record the video and the audio signals and the CM information accompanied with the CM, so that it may efficiently reproduce the TV signal on the reproducing apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for receiving a broadcasting program composed of video data and audio data and recording said broadcasting program, comprising:

means for detecting a commercial message from said broadcasting program;

means for obtaining commercial message information including position information indicative of a position of the commercial message and genre information indicative of the genre of the commercial message; and means for recording on a recording medium said commercial message information together with said broadcasting program, wherein the number of reproductions of a respective commercial message recorded on the recording medium is controlled according to a number of attributes including the genre information.

2. The apparatus as claimed in claim 1, wherein said means for detecting a commercial message is executed to detect said commercial message when a pilot signal of a sound multiplex mode extracted from said TV broadcasting signal is switched.

3. The apparatus as claimed in claim 1, wherein said commercial message information contains commercial message identifying information for determining if the received content of said TV broadcasting signal is detected by said means for detecting the commercial message.

4. The apparatus as claimed in claim 1, wherein said means for generating the commercial message information operates to operate a correlation value between the video signal and the audio signal stored and held at regular intervals after said means for detecting a commercial message detects said commercial message and the video signal and the audio signal obtained at regular intervals after said means for detecting a commercial message newly detects the commercial message and compare both with each other and count a number of times the same commercial message appears.

5. The apparatus as claimed in claim 4, wherein said commercial message information further includes appearance information about the number of times the same commercial message appears.

6. The apparatus as claimed in claim 1, wherein said means for generating commercial message information operates to compare a uniform image signal area cut out of an image with pre-stored character information for comparison and determine the content of a character contained in said uniform image signal area for generating said genre information.

7. A method for receiving a broadcasting program composed of video data and audio data and recording said broadcasting program, comprising the steps of:
  detecting a commercial message from said broadcasting program;
  obtaining commercial message information including position information indicative of a position of the commercial message and genre information indicative of the genre of the commercial message; and
  recording on a recording medium said commercial message information together with said broadcasting program,
  wherein the number of reproductions of a respective commercial message recorded on the recording medium is controlled according to a number of attributes including the genre information.

8. The method as claimed in claim 7, wherein said commercial message is detected when a pilot signal of a sound multiplex mode extracted from said TV broadcasting signal is switched.

9. The method as claimed in claim 7, wherein said commercial message information contains information for identifying a commercial message for determining if the commercial message is detected from the received content of said TV broadcasting signal.

10. The method as claimed in claim 7, further comprising the steps of operating a correlation value between the video and the audio signals stored and held at regular intervals after detecting said commercial message and the video and the audio signals obtained at regular intervals after detecting a new commercial message and comparing both with each other and counting a number of times the same commercial message appears.

11. The method as claimed in claim 10, wherein said commercial message information further includes appearance information about the number of times the same commercial message appears.

12. The method as claimed in claim 7, wherein said genre information is generated by comparing a uniform image signal area cut out of an image with pre-stored character information for comparison and determining a content of a character contained in said uniform image signal area.

13. An apparatus for reproducing a broadcasting program composed of video data and audio data recorded on a recording medium, comprising:
  means for reproducing the broadcasting program from said recording medium along with commercial message information including position information indicative of a position of the commercial message and a number of attributes of the commercial message including genre information indicative of the genre of the commercial message; and
  means for controlling the number of reproductions of a respective commercial message according to the number of attributes including the genre information.

14. The apparatus as claimed in claim 13, wherein said controlling means operates to skip the reproduction to a commercial message identifying signal for indicating the program when the commercial message information separated by said means for separating a signal contains a commercial message identifying signal for indicating a commercial message interval.

15. The apparatus as claimed in claim 13, wherein the commercial message information further includes appearance if information about the number of times the commercial message appears and wherein if said appearance information is larger than a given value, said controlling means operates to stop the reproduction of that interval and skip the reproduction to a closer one of the location where said commercial message identifying signal indicates the program and the location where the number of times are smaller than a given value.

16. The apparatus as claimed in claim 13, wherein said controlling means operates to reproduce only the commercial message whose genre information recorded on said recording medium is matched to that specified by a user.

17. A method for reproducing a broadcasting program composed of video data and audio data recorded on a recording medium, comprising the steps of:
  reproducing the broadcasting program from said recording medium along with commercial message information including position information indicative of a position of the commercial message and a number of attributes of the commercial message including genre information indicative of the genre of the commercial message; and
  controlling the number of reproductions of a respective commercial message according to the number of attributes including the genre information.

18. The method as claimed in claim 17, wherein when said separated commercial message information contains a commercial message identifying signal for indicating a commercial message interval, the reproduction is skipped to the location of the commercial message identifying signal for indicating the program.

19. The method as claimed in claim 17, wherein the commercial message information further includes appearance information indicative of the number of times the commercial message appears and wherein if said appearance information is larger than a given value, the reproduction is not done in that interval and is skipped to a closer one of the location where a commercial message identifying signal indicates the program and the location where the number of times are smaller than the given value.

20. The method as claimed in claim 17, wherein the commercial message is reproduced only if the genre information of the commercial message recorded on said recording medium is matched to that specified by a user.

21. An apparatus for receiving a broadcasting program composed of video data and audio data and recording said broadcasting program on a recording medium and reproducing said broadcasting program from said recording medium, comprising:
  means for detecting a commercial message from said broadcasting program;

means for obtaining commercial message information including position information indicative of a position of the commercial message and genre information indicative of the genre of the commercial message;

means for recording on said recording medium said commercial message information together with said broadcasting program;

means for separately extracting said commercial message information recorded on said recording medium; and means for controlling the number of reproductions of a respective commercial message recorded on the recording medium according to the number of attributes including the genre information.

22. The apparatus as claimed in claim 21, wherein said means for detecting a commercial message operates to detect said commercial message when a pilot signal of a sound multiplex mode extracted from said TV broadcasting signal is switched.

23. The apparatus as claimed in claim 21, wherein said commercial message information contains commercial message identifying information for determining the commercial message is detected from the received content of said TV broadcasting signal by said means for detecting a commercial message.

24. The apparatus as claimed in claim 21, wherein said means for generating commercial message information operates to derive a correlation value between the video signal and the audio signal stored and held at given intervals after said means for detecting a commercial message detects said commercial message and the video signal and the audio signal obtained at given intervals after said means for detecting a commercial message newly detects said commercial message and compare both with each other and count a number of times the same commercial message appears.

25. The apparatus as claimed in claim 24, wherein said commercial message information further includes appearance information about the number of times the same commercial message appears.

26. The apparatus as claimed in claim 21, wherein said means for generating commercial message information operates to compare a uniform image signal area cut out of an image with pre-stored character information for comparison and determine a content of a character contained in said uniform image signal area for detecting said genre information.

27. The apparatus as claimed in claim 21, wherein said means for controlling the reproduction operates to skip the reproduction to the location of the commercial message identifying signal for indicating the program when the commercial message information separated by said means for separating a signal contains a commercial message identifying signal for indicating a commercial message interval.

28. The apparatus as claimed in claim 21, wherein the commercial message information further includes appearance information indicative of the number of times the commercial message appears and wherein if said appearance information is larger than a given value, said means for controlling the reproduction operates to stop the reproduction of that interval and skip to a closer one of the location where a commercial message identifying signal indicates the program and the location where the the number of times are smaller than the given value.

29. The apparatus as claimed in claim 21, wherein said means for controlling the reproduction operates to reproduce a commercial message only if the genre information is matched to that specified by a user.

30. A recording medium having recorded thereon a program and a commercial message composed of video data and audio data, and commercial message information including position information indicative of a position of the commercial message and genre information indicative of the genre of the commercial message, in which the number of reproductions of a respective commercial message recorded on the recording medium is controlled according to a number of attributes including the genre information.

31. The recording medium as claimed in claim 30, wherein said commercial message information contains information for identifying a commercial message for determining if the recorded content is a commercial message.

32. The recording medium as claimed in claim 30, wherein said commercial message information further includes appearance information about the number of times the same commercial message appears.

* * * * *